(12) United States Patent
Jun et al.

(10) Patent No.: US 10,523,385 B2
(45) Date of Patent: Dec. 31, 2019

(54) METHOD AND DEVICE FOR TRANSMITTING SIGNAL OF BASE STATION IN WIRELESS COMMUNICATION SYSTEM

(71) Applicant: Samsung Electronics Co., Ltd., Suwon-si, Gyeonggi-do (KR)

(72) Inventors: Byungwook Jun, Seoul (KR); Hojoong Kwon, Suwon-si (KR); Eunyong Kim, Yongin-si (KR); Joseph Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/762,784

(22) PCT Filed: Sep. 30, 2016

(86) PCT No.: PCT/KR2016/010975
§ 371 (c)(1),
(2) Date: Mar. 23, 2018

(87) PCT Pub. No.: WO2017/057949
PCT Pub. Date: Apr. 6, 2017

(65) Prior Publication Data
US 2018/0302199 A1    Oct. 18, 2018

(30) Foreign Application Priority Data

Sep. 30, 2015 (KR) .................. 10-2015-0137801

(51) Int. Cl.
*H04L 5/00* (2006.01)
*H04W 24/10* (2009.01)
(Continued)

(52) U.S. Cl.
CPC .......... *H04L 5/0035* (2013.01); *H04B 7/024* (2013.01); *H04W 24/10* (2013.01); *H04W 28/02* (2013.01);
(Continued)

(58) Field of Classification Search
CPC .................................................. H04L 5/0035
(Continued)

(56) References Cited

U.S. PATENT DOCUMENTS

2011/0237272 A1* 9/2011 Gorokhov ............... H04B 7/024
455/452.1
2014/0022924 A1* 1/2014 Cili ........................ H04W 24/08
370/252
(Continued)

FOREIGN PATENT DOCUMENTS

KR   10-2012-0062809 A    6/2012
KR   10-2014-0082586 A    7/2014
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0, Mar. 2015.
(Continued)

*Primary Examiner* — Shripal K Khajuria
(74) *Attorney, Agent, or Firm* — Jefferson IP Law, LLP (57) ABSTRACT

A method for transmitting a signal of a base station in a wireless communication system, according to an embodiment of the present invention, comprises the steps of: transmitting transmission standby traffic indication information to a node when a first traffic is received in a first duration; and determining whether to transmit the transmis-
(Continued)

sion standby traffic indication information to the node in a second duration, on the basis of whether the transmission standby traffic indication information has been transmitted in the first duration and whether a second traffic has been received in the second duration.

13 Claims, 8 Drawing Sheets

(51) Int. Cl.
*H04W 28/02* (2009.01)
*H04W 28/14* (2009.01)
*H04W 88/08* (2009.01)
*H04W 92/20* (2009.01)
*H04W 72/04* (2009.01)
*H04B 7/024* (2017.01)
*H04W 72/12* (2009.01)

(52) U.S. Cl.
CPC ....... *H04W 28/0278* (2013.01); *H04W 28/14* (2013.01); *H04W 72/0426* (2013.01); *H04W 72/1273* (2013.01); *H04W 72/1278* (2013.01); *H04W 88/08* (2013.01); *H04W 92/20* (2013.01)

(58) Field of Classification Search
USPC ........................................................ 370/328
See application file for complete search history.

(56) References Cited

U.S. PATENT DOCUMENTS

2014/0050183 A1* 2/2014 Mochizuki ........ H04W 72/1278
370/329

2014/0177560 A1   6/2014 Guo
2018/0006780 A1   1/2018 Jeon et al.

FOREIGN PATENT DOCUMENTS

KR   10-2015-0007593 A   1/2015
KR   10-2015-0038198 A   4/2015
KR   10-2016-0089238 A   7/2016
WO   WO-2015005738 A1 *  1/2015   ............ H04W 28/02

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.5.0, Mar. 2015.
Samsung, Introduction of enhanced inter-eNB CoMP signalling, 3GPP TSG-RAN WG3 Meeting #87bis, R3-150918 Santa Cruz, Spain, Apr. 20-24, 2015.
Ericsson et al: "Specification of RN behaviour", 3GPP Draft, R2-103845, Specification of RN Behaviour, 3rd Generation Partnership Project (3GPP), Mobile Competence Centre, 650 Route Des Lucioles, F-06921 Sophia Antipolis Cedex, France. vol. RAN WG2. No. 70bis, Stockholm, Sweden, Jun. 28, 2010, Jun. 22, 2010, XP050451252.
Extended European Search Report dated Sep. 11, 2018, issued in European Application No. 16852095.5.

* cited by examiner

METHOD AND DEVICE FOR TRANSMITTING SIGNAL OF BASE STATION IN WIRELESS COMMUNICATION SYSTEM

TECHNICAL FIELD

The present invention relates to a signal transmission method and device of a base station in a wireless communication system and, in particular, to a signal transmission method and device of a base station that is capable of exchanging information on the traffic waiting to be transmitted in the base station in consideration of backhaul delay between base stations.

BACKGROUND ART

Research and standardization activities are being conducted on inter-base station coordinated multi-point transmission and reception (CoMP) technologies in order to improve the throughput of a wireless communication system and user-experienced quality. The inter-base station CoMP is a term that collectively refers to the techniques implemented based on the coordination of transmission points or reception points that are deployed far from each other geographically.

The 3GPP LTE Release 12 specifies the base station operation and signaling in association with inter-base station CoMP (inter-eNB CoMP) as follows.

A serving base station generates a reference signal received power (RSRP) measurement report information element (IE) based on the measurement report information collected from the terminals it serves and transmits the corresponding information to neighboring base stations.

Each neighboring base station determines a COMP information IE based on the information collected from multiple base stations including the serving base station and transmits the corresponding information to the multiple base stations including the serving base station.

The CoMP information IE includes a CoMP hypothesis IE as hypothetical resource allocation information, a benefit metric related thereto, and a COMP Information Start Time IE indicating the time point when the CoMP information IE is applicable.

The CoMP hypothesis IE indicates interference-protected resource and resource with no utilization constraint by physical resource block (PRB). The benefit metric indicates the magnitude of usefulness that is predicted under the assumption that a related COMP hypothesis IE is applied. The CoMP information start time IE indicates a time point when the CoMP information IE is applicable.

The serving base station may perform radio resource management (RRM) including inter-base station CoMP based on the received CoMP information IE. For example, the serving base station may allocate radio resources to the terminal and perform base station-terminal link adaptation based on the CoMP information IE.

However, there may be a backhaul delay between the serving base station and the neighboring base station, and a backhaul delay may restrict the data transmission chances of the serving base station more than necessary or make the base station perform link adaptation passively, resulting in radio resource management inefficiency.

DISCLOSURE OF INVENTION

Technical Problem

The present invention aims to provide a signal transmission method and device of a base station that is capable of exchanging information on the traffic in the base station waiting to be transmitted in consideration of backhaul delay between base stations.

Solution to Problem

In accordance with an aspect of the present invention, a signal transmission method of a base station in a wireless communication system includes transmitting, when first traffic is received, transmission-waiting traffic indication information to a node in a first period and determining whether to transmit the transmission-waiting traffic indication information to the node in a second period based on whether the transmission-waiting traffic indication information is transmitted in the first period and whether second traffic is received in the second period.

Preferably, the signal transmission method further includes determining, when the transmission-waiting traffic indication information is transmitted in the first period and the second traffic is not transmitted in the second period, to skip transmission of the transmission-waiting traffic indication information to the node in the second period.

Preferably, the signal transmission method further includes determining, when the second traffic is received in the second period, to transmit the transmission-waiting traffic indication information to the node in the second period.

Preferably, the signal transmission method further includes receiving, at the base station, coordinated multi-point transmission (CoMP) information corresponding to the transmission-waiting traffic indication from the node and performing, at the base station, radio resource management based on the CoMP information.

In accordance with another aspect of the present invention, a base station in a wireless communication system includes a transceiver configured to communicate a signal with a terminal and a node and a controller configured to control to transmit, when first traffic is received, transmission-waiting traffic indication information to a node in a first period and determine whether to transmit the transmission-waiting traffic indication information to the node in a second period based on whether the transmission-waiting traffic indication information is transmitted in the first period and whether second traffic is received in the second period.

Advantageous Effects of Invention

The signal transmission method and device of a base station is advantageous in terms of improving radio resource management efficiency in a wireless communication system by allowing exchange of information on the traffic in the base station waiting to be transmitted in consideration of backhaul delay between base stations.

BRIEF DESCRIPTION OF DRAWINGS

A brief description of each drawing is provided in order to more fully understand the drawings cited in the detailed description of the present invention.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the description is directed to an advanced E-UTRA (or LTE-A) system supporting carrier aggregation, it will be understood by those skilled in the art that the present invention can be applied even to other communication systems having the similar technical background and channel format. For example, the present invention is applicable to multicarrier HSPA supporting carrier aggregation.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions, which are executed via the processor of the computer or other programmable data processing apparatus, create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions, which are executed on the computer or other programmable apparatus, provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In the following description, the term "module" may be intended to mean a hardware for executing a function and operation corresponding to its name, a computer program code for executing a particular function and operation, or an electronic recording medium, e.g., a processor, storing a computer program code for executing a particular function and operation.

Figure 1:
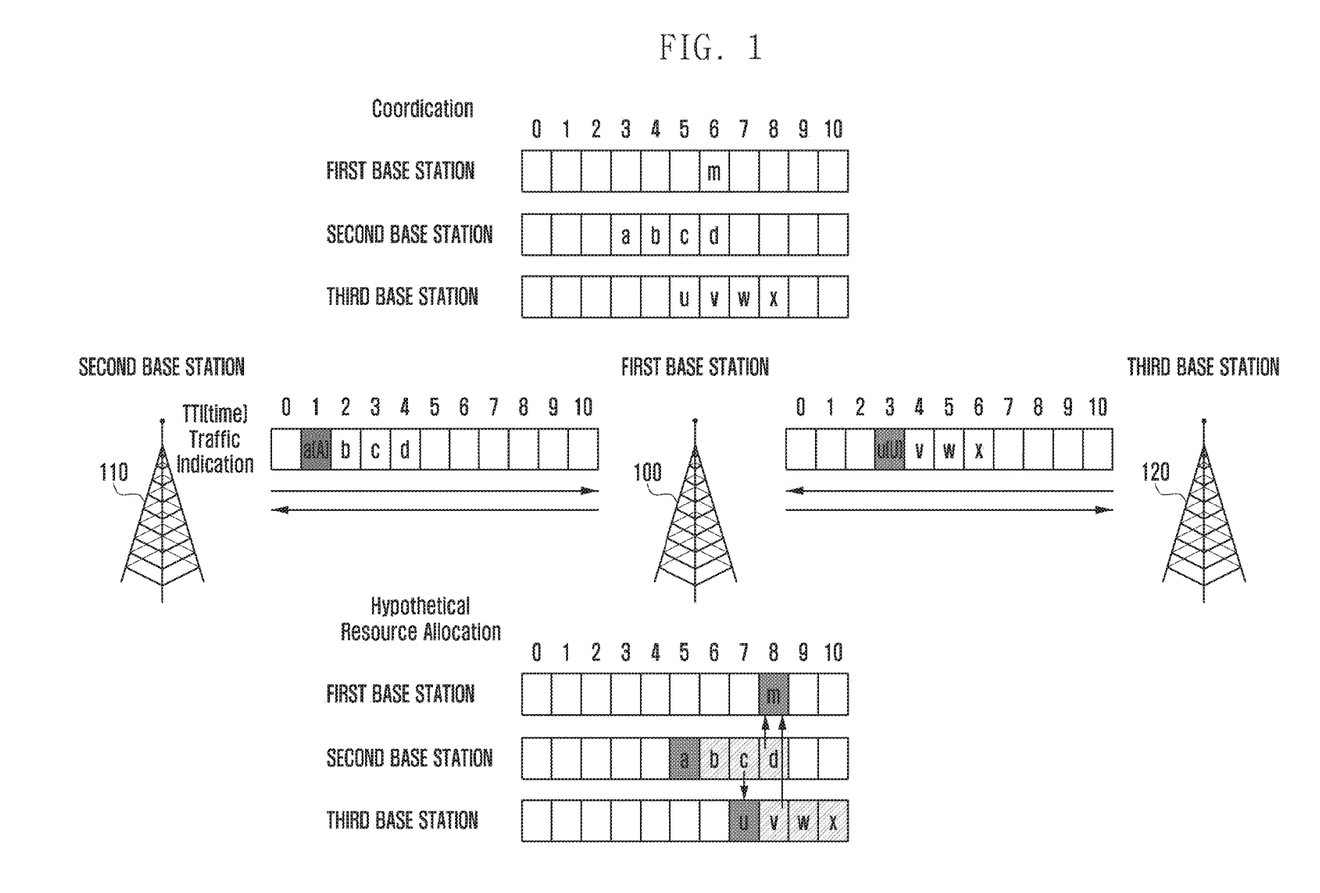
FIG. 1 is a diagram for explaining a procedure for processing traffic in inter-base station CoMP.

FIG. 1 is a diagram for explaining a procedure for processing traffic in inter-base station CoMP. In reference to FIG. 1, the base stations 100, 110, and 120 may perform inter-base station COMP in a manner centralized to the first base station 100.

For convenience of explanation, it is assumed that the inter-base station backhaul delay is 2 transmission time intervals (TTIs), and the hypothetical resource allocation processing delay is 0 TTI, and the second base station 110 has been waiting for 4 TTIs before the first TTI.

In the following description, transmission-waiting traffic indication information may mean the information indicating the presence of traffic waiting to be transmitted in the transmission buffer of the base station.

If traffic A, which can be transmitted in unit of one TTI, arrives at the second base station 110 in the first TTI, the second base station 110 may transmit a transmission-waiting traffic indication information "a" to the first base station 100.

The first base station 100 may receive the transmission-waiting traffic indication information "a" in the third TTI delayed as much as the inter-base station backhaul delay of 2 TTIs and transmit the hypothetical resource allocation information corresponding to the transmission-waiting traffic indication information "a" to the second base station 110 in the third TTI.

The second base station 110 may receive the hypothetical resource allocation information in the fifth TTI delayed as much as the inter-base station backhaul delay of 2 TTIs. The second base station 110 may not transmit the traffic "A" to a terminal before receiving the hypothetical resource allocation information from the first base station and may transmit to the first base station 100 the transmission-waiting traffic indication information "a," "b," "c," and "d" in the first to fourth TTIs in sequence.

The second base station 110 may perform packet scheduling and link adaptation based on the hypothetical resource allocation received in the fifth TTI. The second base station 110 may transmit traffic "A" to the terminal based on the hypothetical resource allocation information.

If traffic U, which can be transmitted in unit of one TTI, arrives at the third base station 110 in the third TTI, the third base station 120 may transmit the transmission-waiting traffic indication information "u" to the first base station 100.

The first base station 100 may receive the transmission-waiting traffic indication information "u" in the fifth TTI delayed as much as the inter-base station backhaul delay of 2 TTIs and transmit the hypothetical resource allocation information corresponding to the transmission-waiting traffic indication information "u" to the third base station 120 in the fifth TTI.

The third base station 120 may receive the hypothetical resource allocation information in the seventh TTI delayed as much as the inter-base station backhaul delay of 2 TTIs. The third base station 120 may not transmit traffic "B" to the terminal before receiving the hypothetical resource allocation information from the first base station 100 and may transmit the transmission-waiting traffic indication information "u," "v," "w," and "x" in the third to sixth TTIs in sequence.

The third base station 120 may perform packet scheduling and link adaptation based on the hypothetical resource allocation received in the seventh TTI. The third base station 120 may transmit traffic "U" to the terminal based on the hypothetical resource allocation.

Suppose that the second base station 110 completes transmitting traffic "A" to the terminal for 1 TTI in the fifth TTI. In this case, the third base station 120 performs link adaptation under the assumption that the second base station 110 transmits traffic A in the seventh TTI based on the hypothetical resource allocation information received from the first base station 100, even though the second base station 100 actually transmits no traffic, resulting in inefficiency of link adaptation.

Suppose that the second base station 110 completes transmitting traffic "A" for 1 TTI in the fifth TTI and the third base station 120 completes transmitting traffic "U" for 1 TTI in the seventh TTI. In this case, the first base station 100 performs link adaptation under the assumption that both the second and third base stations 110 and 120 transmit traffic in the eighth TTI even though the second and third base stations 110 and 120 actually transmit no traffic, resulting in inefficiency of link adaptation.

Figure 2:
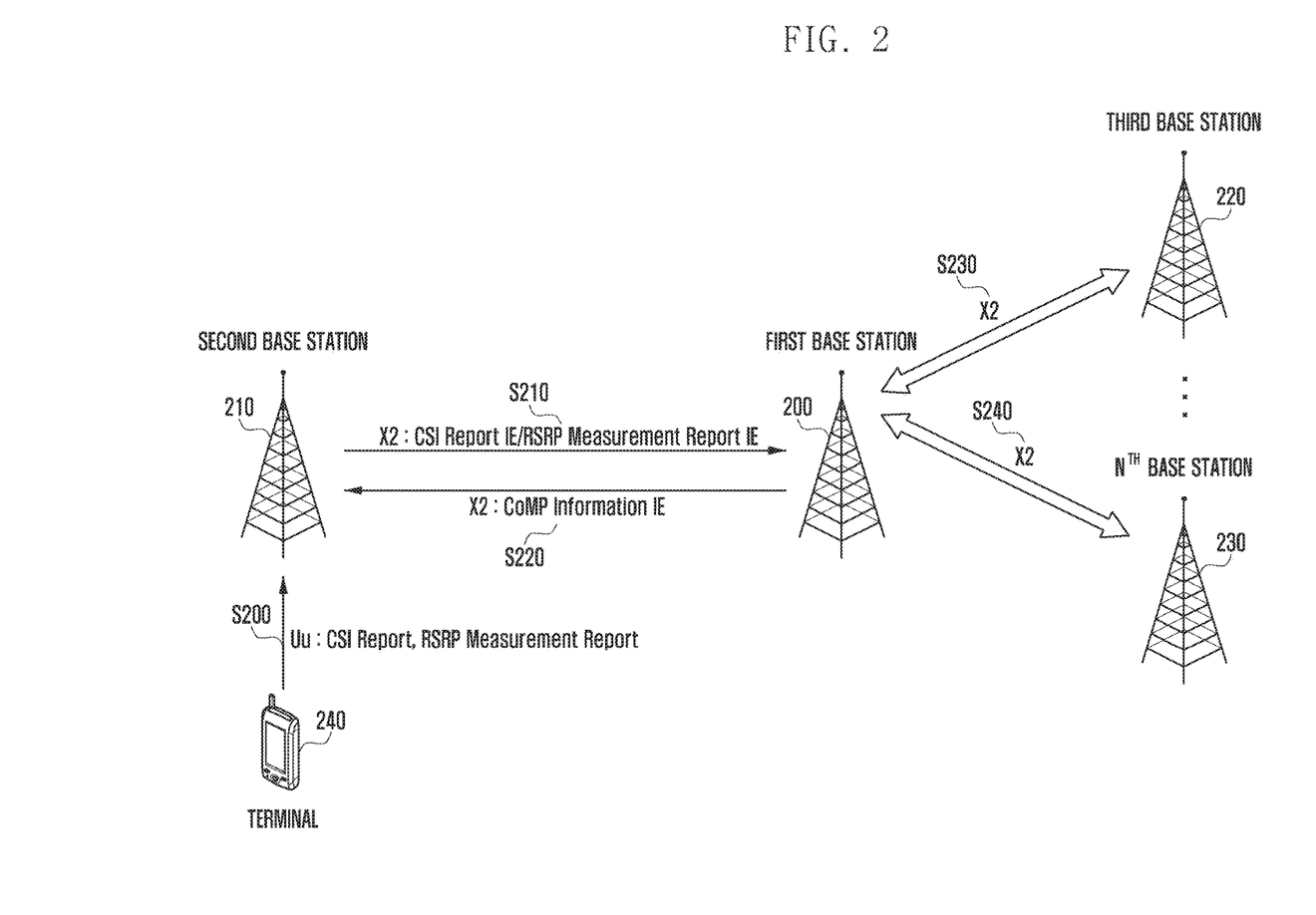
FIG. 2 is a diagram for explaining an inter-base station CoMP communication procedure in a wireless communication system according to an embodiment of the present invention.

FIG. 2 is a diagram for explaining an inter-base station CoMP communication procedure in a wireless communication system according to an embodiment of the present invention. In reference to FIG. 2, the base stations 200, 210, 220, and 230 may perform inter-base station CoMP in a manner centralized to the first base station 200.

However, the inter-base station CoMP communication procedure is not limited to the centralized mode, and it may be applied to the case where the base stations 200 to 230 perform the inter-base station COMP in a distributed manner.

The base stations 200 to 230 may communicate among each other through an inter-base station backhaul interface (X2 interface), and the terminal 240 may communicate with the serving base station 210 through a wireless access interface (Uu interface).

The UE 240 may transmit first information (RSRP Measurement Report) including reference signal received power (RSRP) and second information (CSI Report) including channel state information (CSI) to its serving base station, i.e., the second base station 210, through a terminal-base station interface at step 200.

The second base station 210 may determine the presence/absence of traffic waiting to be transmitted in the second base station 210 based on at least one of the first and second information.

The base station 210 may generate third information (RSRP Measurement Report IE) corresponding to the first information and fourth information (CSI Report IE) corresponding to the second information based on the first and second information and the determination result and transmit the third and fourth information to the first base station 200 through the inter-base station interface at step S210.

The fourth information may include transmission-waiting traffic indication information for indicating presence of the traffic waiting to be transmitted in the transmission buffer of the second base station 210.

The first base station 200 may adjust radio resource allocation based on the information (e.g., the third information and the fourth information) received from at least one base station including the second base station 210 and generate a CoMP Information IE including the adjusted radio resource allocation information.

The first base station 200 may transmit the CoMP information to the second base station 210 through the inter-base station interface at step S220. The first base station 200 may transmit the CoMP information to the third base station 220 through the inter-base station interface at step S230 or an $n^{th}$ base station 230 (here, n is a natural number greater than 3) through the inter-base station interface at step S240.

Each of the second base station 210, the third base station 220, and the $n^{th}$ base station 230 may perform radio resource management based on the COMP information.

Alternatively, the base stations 200 to 230 may perform inter-base station COMP in a distributed manner and, in this case, each of the base stations 200 to 230 may perform the functions of both the first and second base stations 200 and 210.

Figure 3:
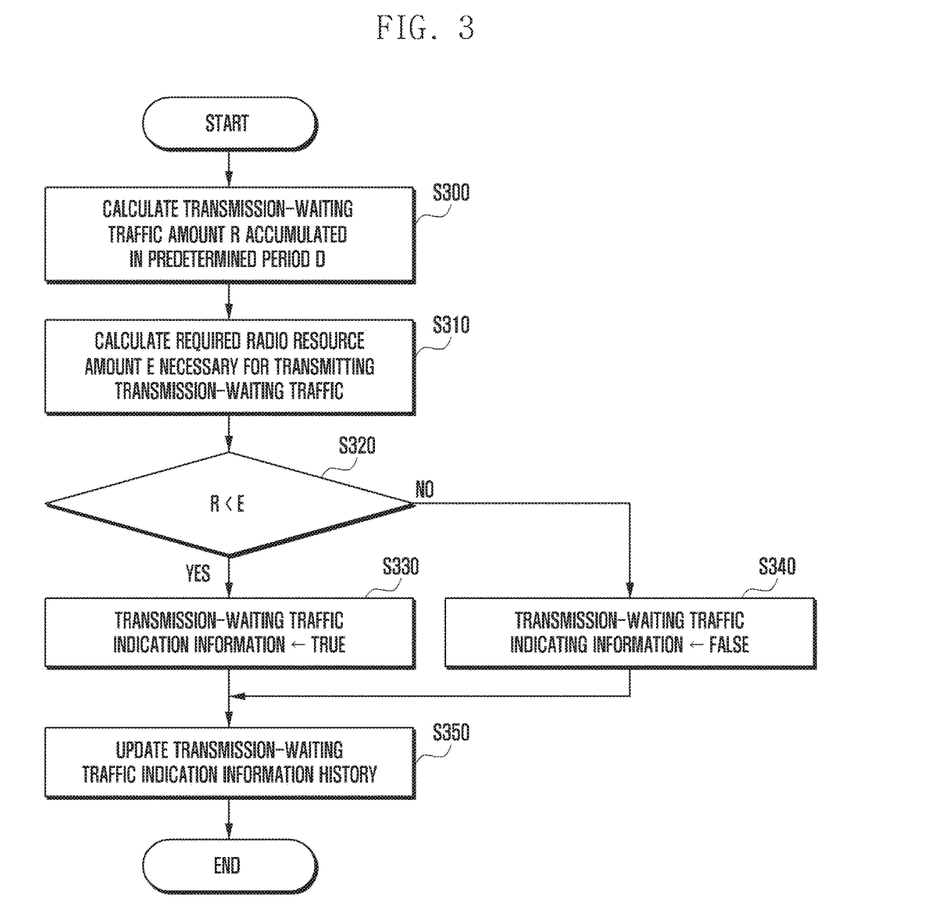
FIG. 3 is a flowchart illustrating a transmission-waiting traffic indication information generation procedure of a base station according to an embodiment of the present invention.

FIG. 3 is a flowchart illustrating a transmission-waiting traffic indication information generation procedure of a base station according to an embodiment of the present invention. The base station may determine whether to transmit the transmission-waiting traffic indication information to another base station at an inter-base station message transmission timing based on the transmission-waiting traffic indication information history for a predetermined time period and amount of radio resources necessary for transmitting the traffic waiting to be transmitted in the transmission buffer of the base station.

In reference to FIGS. 2 and 3, the base station may determine whether to transmit the transmission-waiting traffic indication information whenever transmitting the fourth information (CSI Report IE) to another base station.

The base station may calculate accumulated transmission-waiting traffic amount R based on the transmission-waiting traffic indication information history for a predetermined period D at step S300.

$$R = \sum_{i=1}^{D} I[i] \quad \text{[Equation 1]}$$

According to an embodiment of the present invention, the accumulated transmission-waiting traffic amount R may be determined by Equation 1. In Equation 1, D denotes transmission-waiting traffic indication information history, I denotes a transmission resource index in the transmission-waiting traffic indication information history, I[i] is set to 0 for the case where the transmission-waiting traffic indication information is false in the radio resource and 1 for the case where the transmission-waiting traffic indication information is true in the radio resource.

For example, D may denote a period starting at the time point when the base station generates and transmits the CSI Report IE information to another base station and ending at the time point when the base station receives the CoMP Information IE related to the corresponding information from the other base station.

According to an embodiment of the present invention, the unit of the accumulated transmission-waiting traffic amount R may be a resource block, a subframe, or multiple subframes.

The base station may calculate a required radio resource amount E predictable for transmitting the traffic waiting to be transmitted in the transmission buffer of the base station at step S310.

$$E = \sum_{u \in U} \frac{B_u}{r_u} \quad \text{[Equation 2]}$$

According to an embodiment of the present invention, the required radio resource amount E may be determined by Equation 2. In Equation 2, U denotes a set of terminals being served by the base station, u denotes one of terminals being served by the base station, $B_u$ denotes traffic amount waiting to be transmitted to terminal u in the transmission buffer, and $r_u$ denotes the allowed data rate of the terminal u.

According to an embodiment of the present invention, the unit of required radio resource amount E may be a resource block, a subframe, or multiple subframes.

The base station may compare the accumulated transmission-waiting traffic amount R and the required radio resource amount E at step S320. As a result of the comparison, if the required radio resource amount E is greater than the accumulated transmission-waiting traffic amount R, this means that the transmission-waiting traffic indication information is true; thus, the base station may generate the transmission waiting traffic indication information at step S330.

As a result of the comparison, if the accumulated transmission-waiting traffic amount R is equal to or greater than the required radio resource amount E, this means that the transmission-waiting traffic indication information is false, and the base station may not generate the transmission-waiting traffic indication information at step S340.

The base station may update the transmission-waiting traffic indication information history at step S350 based on whether the transmission-waiting traffic indication information is true or false.

Figure 4:
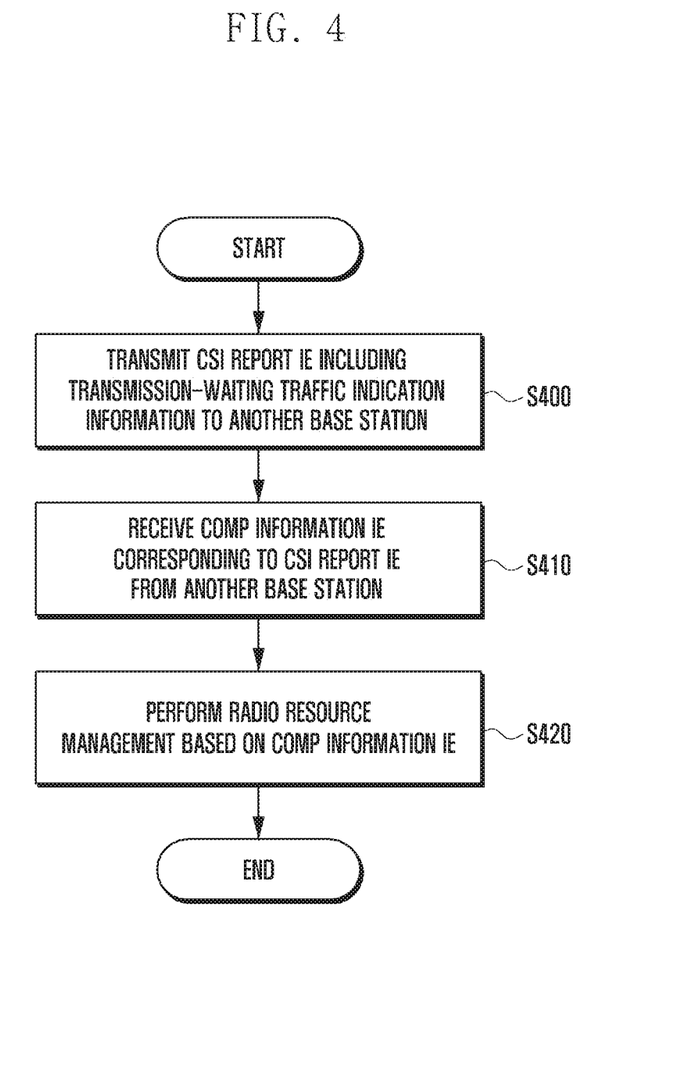
FIG. 4 is a flowchart illustrating a COMP procedure of a base station according to an embodiment of the present invention.

FIG. 4 is a flowchart illustrating a CoMP procedure of a base station according to an embodiment of the present invention. In reference to FIGS. 2 to 4, if the transmission-waiting traffic indication information is true, the base station may transmit the CSI Report IE including the transmission-waiting traffic indication information to another base station at step S400.

According to an alternative embodiment, if the transmission waiting traffic indication information is false, the base station may transmit a message including no transmission-waiting traffic indication information to another base station.

The base station may receive a COMP Information IE corresponding to the CoMP Report IE from the other base station at step S410. The CoMP Information IE may be the CoMP information determined in consideration of the traffic waiting to be transmitted in the neighboring base stations including the other base station.

The base station may perform radio resource management based on the CoMP Information IE at step S420. The radio resource management may include packet scheduling and link adaptation.

Figure 5:
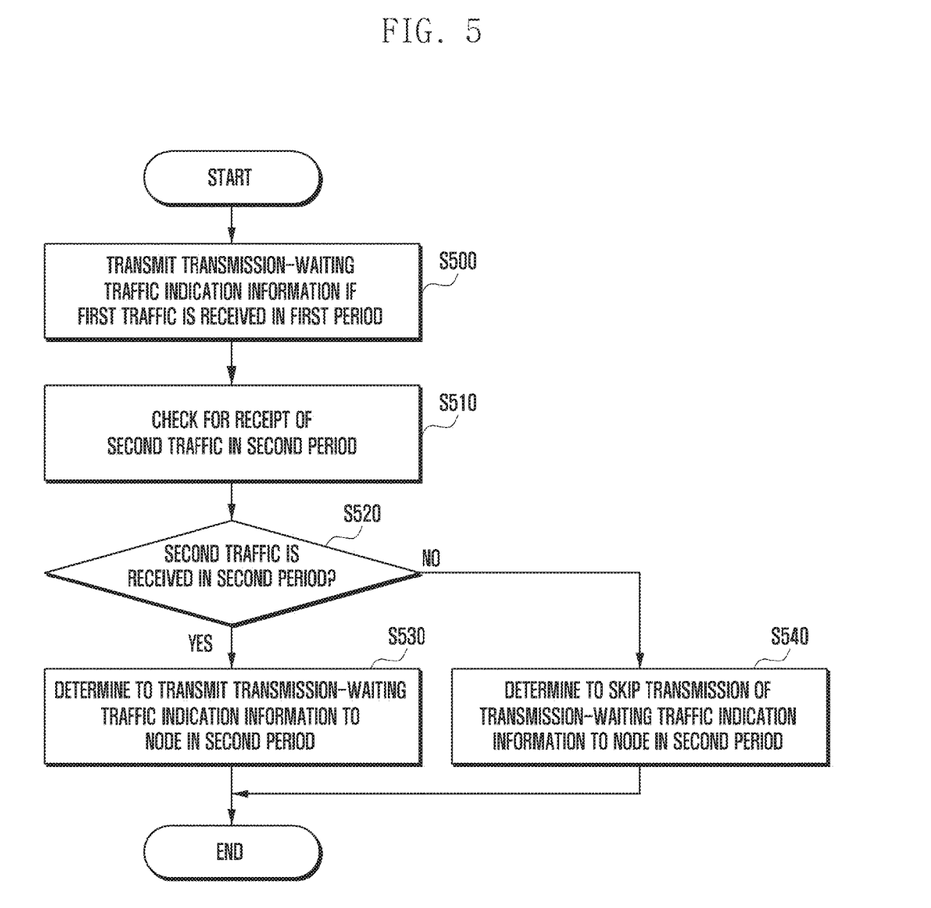
FIG. 5 is a flowchart illustrating a transmission-waiting traffic indication information transmission procedure of a base station according to an embodiment of the present invention.

FIG. 5 is a flowchart illustrating a transmission-waiting traffic indication information transmission procedure of a base station according to an embodiment of the present invention.

In reference to FIGS. 2 to 5, if the base station receives first traffic in the first period, it may transmit the transmission-waiting traffic indication information to a node at step S500.

The node may mean at least one function unit connected to a data transmission path or another base station different from the base station. The first period may be one or more TTIs, and the first traffic may be transmitted to a terminal.

According to an alternative embodiment, if the first traffic is not received, the base station may not transmit the transmission-waiting traffic indication information to the node in the first period.

The base station may check at step S510 whether second traffic is received in the second period. The second period may be one or more TTIs, and the second traffic may be transmitted to the terminal.

As a result of determinationif it is determined at step 520 that the second traffic is received in the second period, the base station may determine at step S530 to transmit the transmission-waiting traffic indication information in the second period.

As a result of the determination, if it is determined at step S520 that the second traffic is not received in the second period, the base station may determine at step S540 to skip transmitting the transmission-waiting traffic indication information to the node. That is, if the base station has transmitted the transmission-waiting traffic indication information to the node in the first period, it may determine whether to transmit the transmission-waiting traffic indication information to the node depending on whether the traffic is received in the second period.

According to an embodiment of the present invention, the first traffic and the second traffic may be identical with each other. According to an alternative embodiment, the first traffic and the second traffic may different from each other.

The base station may receive COMP information corresponding to the transmission-waiting traffic indication information from the node and perform radio resource measurement based on the CoMP information.

Figure 6:
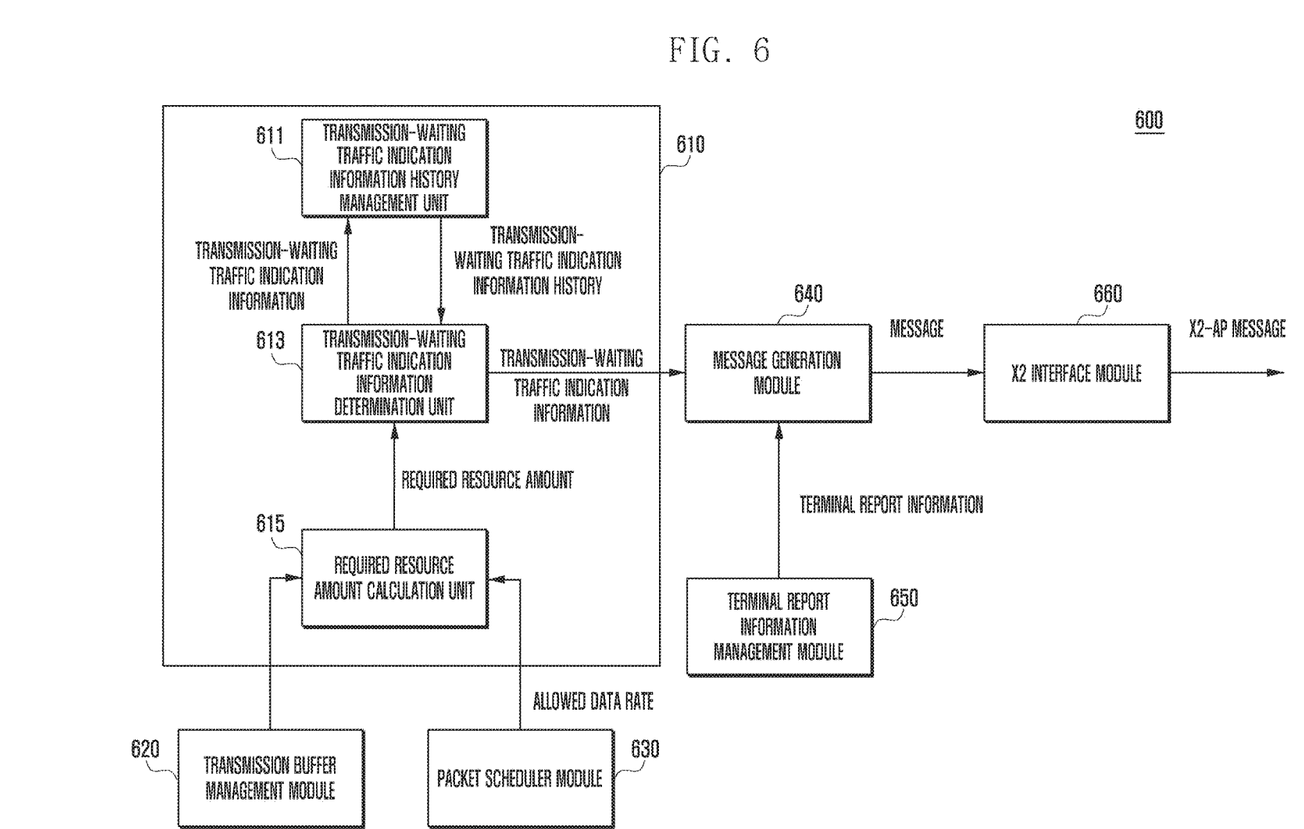
FIG. 6 is a diagram illustrating a transmission-waiting traffic indication information generation and transmission device of a base station according to an embodiment of the present invention.

FIG. 6 is a diagram illustrating a transmission-waiting traffic indication information generation and transmission device of a base station according to an embodiment of the present invention. In reference to FIG. 6, the base station may include a transmission-waiting traffic indication information generation and transmission device 600.

The transmission-waiting traffic indication information generation and transmission device 600 may include a transmission-waiting traffic indication information generation module 610, a transmission buffer management module 620, a packet scheduler module 630, a message generation module 640, a terminal report information management module 650, and an X2 interface module 660.

The transmission-waiting traffic indication information generation module 610 may receive transmission-waiting traffic amount information from the transmission buffer management module 620 and determine (or generate) transmission-waiting traffic indication information using the transmission-waiting traffic amount information and allowed data rate.

The transmission-waiting traffic indication information generation module 610 may transmit the determined (or generated) transmission-waiting traffic indication information to the message generation module 640.

The transmission-waiting traffic indication information generation module 610 may include a transmission-waiting traffic indication information history management unit 611, a transmission-waiting traffic indication information determination unit 613, and a required resource amount calculation unit 615.

The transmission-waiting traffic indication information history management unit 611 may receive transmission-waiting traffic indication information from the transmission-waiting traffic indication information determination unit 613 and manage the transmission-waiting traffic indication information history.

The transmission-waiting traffic indication information history management unit 611 may process the transmission-waiting traffic indication information to update the transmission-waiting traffic indication information history. The transmission-waiting traffic indication information history management unit 611 may transmit the updated transmission-waiting traffic indication information history to the transmission-waiting traffic indication information determination unit 613.

The transmission-waiting traffic indication information determination unit 613 may receive the transmission-waiting traffic indication information history from the transmission-waiting traffic indication information history management unit 611 and the required resource amount information from the required resource amount calculation unit 615 and determine (or generate) transmission-waiting traffic indication information using the transmission-waiting traffic indication information history and the required resource amount information.

According to an embodiment of the present invention, the transmission-waiting traffic indication information determination unit 613 may calculate an accumulated transmission-waiting traffic amount (R of FIG. 3) from the transmission-waiting traffic indication information and compare the accumulated transmission-waiting traffic amount (R of FIG. 3) and the required resource amount (E of FIG. 3) to determine (or generate) the transmission-waiting traffic indication information.

The transmission-waiting traffic indication information determination unit 613 may transmit the determined (or generated) transmission-waiting traffic indication information to the message generation module 640.

The required resource amount calculation unit 615 may receive the transmission-waiting traffic amount information from the transmission buffer management module 620 and the allowed data rate from the packet scheduler module 630 and process the transmission-waiting traffic amount information and the allowed data rate to calculate (or estimate) required resource amount. The required resource amount may be the required radio resource amount E described with reference to FIG. 3.

The transmission buffer management module 620 may manage the transmission buffer and send the information on the traffic amount buffered in the transmission buffer to the required resource amount calculation unit 615.

The packet scheduler module 630 may estimate an allowed data rate available for the terminal and transmit the allowed data rate to the required resource amount calculation unit 615.

The message generation module 640 may receive the transmission-waiting traffic indication information from the transmission-waiting traffic indication information determination unit 613, process the transmission-waiting traffic indication information and the terminal report information to generate a message, and transmit the message via the X2 interface module 660.

The terminal report information management module 650 may collect and manage CSI and RSRP information reported by a terminal and process the CSI and RSRP information to generate terminal report information. The terminal report information management module 650 may send the terminal report information to the message generation module 650.

The X2 interface module 660 may receive the message from the message generation module 640 and transmit an X2-AP corresponding to the message to neighboring base stations.

Figure 7:
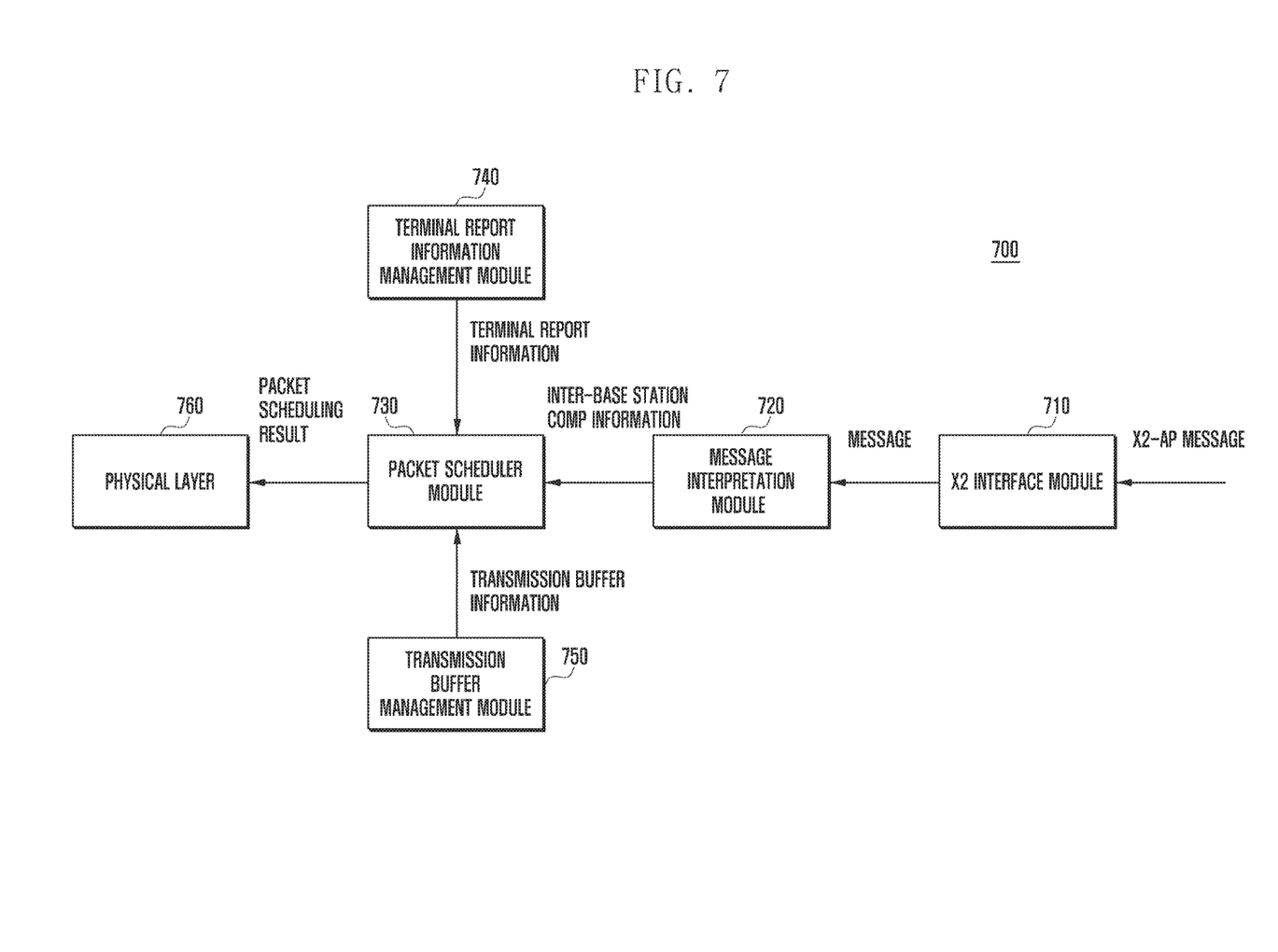
FIG. 7 is a diagram illustrating transmission-waiting traffic indication information of a base station according to an embodiment of the present invention.

FIG. 7 is a diagram illustrating transmission-waiting traffic indication information of a base station according to an embodiment of the present invention. In reference to FIG. 7, the base station may include a transmission-waiting traffic indication information reception device 700.

The transmission-waiting traffic indication information reception device 700 may include an X2 interface module 710, a message interpretation module 720, a packet scheduler module 730, a terminal report information management module 740, a transmission buffer management module 750, and a physical layer 760.

The X2 interface module 710 may receive an X2-AP message from a neighboring base station and send a message corresponding to the X2-AP message to the message interpretation module 720.

The message interpretation module 720 may interpret the message and send inter-base station COMP information corresponding to the message to the packet scheduler module 730 according to the interpretation result.

The packet scheduler module 730 may receive the inter-base station CoMP information from the message interpretation module 720, terminal report information from the terminal report information management module 740, and transmission buffer information from the transmission buffer management module 750.

The packet scheduler module 730 may perform packet scheduling based on the inter-base station COMP information, terminal report information, and transmission buffer information. The packet scheduling may include radio resource allocation and link adaptation. The packet scheduler module 730 may send the packet scheduling result to the physical layer 760.

The terminal report information management module 740 may manage the terminal channel status information reported by the terminal and send the terminal report information corresponding to the terminal channel status information to the packet scheduler module 730.

The transmission buffer management module 750 may manage the transmission buffer and send transmission buffer information to the packet scheduler module 730.

Figure 8:
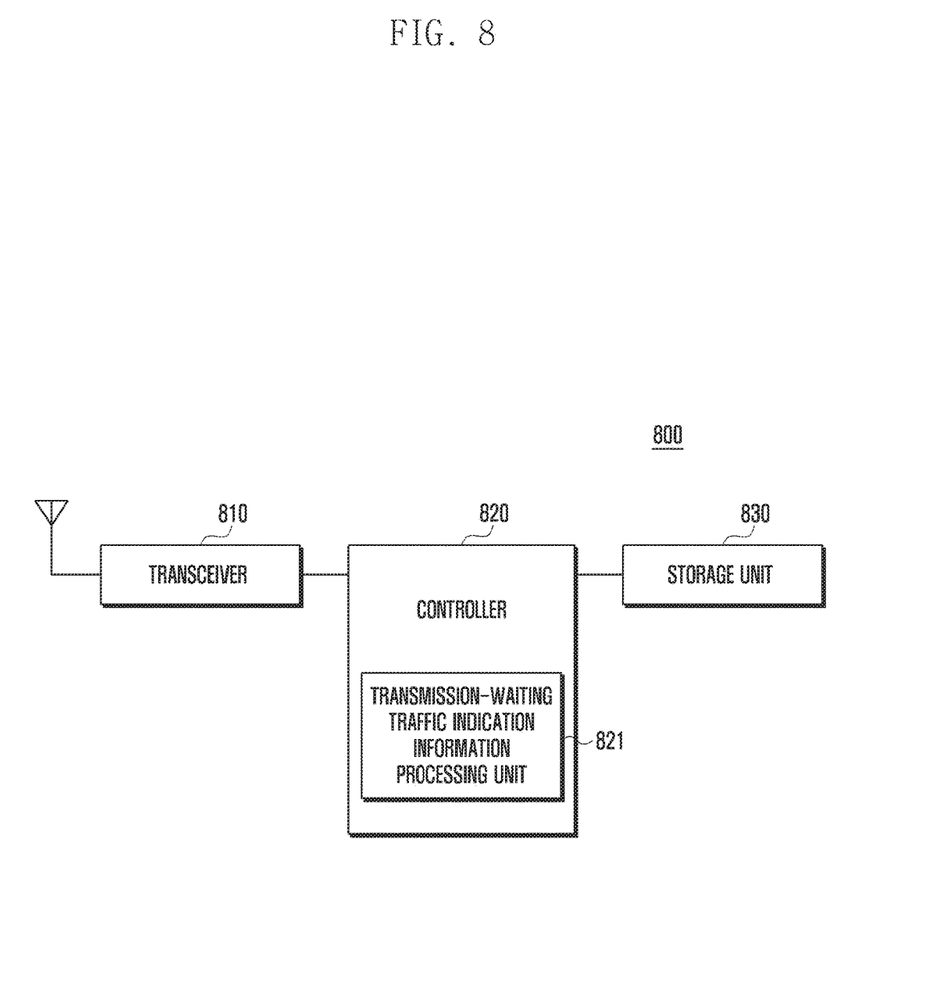
FIG. 8 is a diagram illustrating a configuration of a base station according to an embodiment of the present invention.

The physical layer 760 may receive the packet scheduling result from the packet scheduler module 730 and perform coding, physical layer HARQ processing, modulation, multiantenna processing, and signal mapping to physical time-frequency resource FIG. 8 is a diagram illustrating a configuration of a base station according to an embodiment of the present invention. In reference to FIG. 8, the base station 800 may include a transceiver 810, a controller 820, and a storage unit 830.

The transceiver 810 may perform a data transmission/reception function for radio communication of the base station 800. The transceiver 810 may communicate signals with a terminal or a node. The transceiver 810 may include an RF transmitter for up-converting and amplifying a signal to be transmitted and an RF receiver for low-noise-amplifying and down-converting a received signal.

The transceiver 810 may also receive data over a radio channel and output the data to the controller 820 and transmit data output from the controller 820 over the radio channel.

The controller 820 may control signal flows among the components to implement the operations according to embodiments of the present invention. In detail, if the first traffic is received in the first period, the controller 820 may transmit transmission-waiting traffic indication information to another base station (or node) and determine whether to transmit the transmission-waiting traffic indication information to another base station (or node) in the second period based on whether the transmission-waiting traffic indication information has been transmitted in the first period and whether second traffic is received in the second period.

The controller 820 may also include a transmission-waiting traffic indication information processing unit 821 to perform the above function. The transmission-waiting traffic indication information processing unit 821 may generate transmission-waiting traffic indication information indicating whether there is traffic waiting to be transmitted in the transmission buffer of the base station 800.

The storage unit 830 stores programs and data necessary for the operation of the base station 800 and may be divided into a program region and a data region.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A signal transmission method by a first base station in a wireless communication system, the method comprising:
   transmitting, when first traffic is in a transmission buffer of the first base station in a first period, first transmission-waiting traffic indication information to a second base station in the first period, wherein the first transmission-waiting traffic indication information indicates presence of traffic waiting to be transmitted in the transmission buffer of the first base station;
   identifying whether second traffic is in the transmission buffer of the first base station in a second period; and
   determining whether to transmit second transmission-waiting traffic indication information to the second base station in the second period based on whether the second traffic is in the transmission buffer of the first base station in the second period.

2. The method of claim 1, wherein the first period comprises at least one transmission time interval (TTI) and the second period comprises at least one TTI.

3. The method of claim 1, wherein the first and second traffic are transmitted to a terminal.

4. The method of claim 1, wherein the first traffic is identical with the second traffic.

5. The method of claim 1, wherein the first traffic is different from the second traffic.

6. The method of claim 1, further comprising:
   determining, when the second traffic is not in the transmission buffer of the first base station in the second period, to skip transmission of the second transmission-waiting traffic indication information to the second base station in the second period.

7. The method of claim 1, further comprising:
   determining, when the second traffic is in the transmission buffer of the first base station in the second period, to transmit the second transmission-waiting traffic indication information to the second base station in the second period.

8. The method of claim 1, further comprising:
   receiving coordinated multi-point (CoMP) information corresponding to the first transmission-waiting traffic indication information from the second base station; and
   performing radio resource management based on the CoMP information.

9. A first base station in a wireless communication system, the first base station comprising:
   a transceiver; and
   a controller coupled with the transceiver and configured to control to:
      transmit, when first traffic is in a transmission buffer of the first base station in a first period, first transmission-waiting traffic indication information to a second base station in the first period, wherein the first transmission-waiting traffic indication information indicates presence of traffic waiting to be transmitted in the transmission buffer of the first base station,
      identify whether second traffic is in the transmission buffer of the first base station in a second period, and
      determine whether to transmit second transmission-waiting traffic indication information to the second base station in the second period based on whether the second traffic is in the transmission buffer of the first base station in the second period.

10. The first base station of claim 9, wherein the first period comprises at least one transmission time interval (TTI) and the second period comprises at least one TTI.

11. The first base station of claim 9, wherein the first and second traffic are transmitted to a terminal.

12. The first base station of claim 9, wherein the controller is configured to determine, when the second traffic is not in the transmission buffer of the first base station in the second period, to skip transmission of the second transmission-waiting traffic indication information to the second base station in the second period.

13. The first base station of claim 9, wherein the controller is configured to control to determine, when the second traffic is in the transmission buffer of the first base station in the second period, to transmit the second transmission-waiting traffic indication information to the second base station in the second period.

* * * * *